US009763116B2

United States Patent
McCabe et al.

(10) Patent No.: US 9,763,116 B2
(45) Date of Patent: Sep. 12, 2017

(54) METHOD OF OPTIMIZING DEVICE PERFORMANCE BY MAINTAINING DEVICE WITHIN TEMPERATURE LIMITS

(71) Applicant: Western Digital Technologies, Inc., Irvine, CA (US)

(72) Inventors: Timothy J. McCabe, Mission Viejo, CA (US); John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 49 days.

(21) Appl. No.: 14/525,373

(22) Filed: Oct. 28, 2014

(65) Prior Publication Data

US 2016/0066300 A1    Mar. 3, 2016

Related U.S. Application Data

(60) Provisional application No. 62/042,727, filed on Aug. 27, 2014.

(51) Int. Cl.
*H04W 24/02* (2009.01)
*G06F 1/20* (2006.01)
*G06F 1/32* (2006.01)

(52) U.S. Cl.
CPC ............ *H04W 24/02* (2013.01); *G06F 1/206* (2013.01); *G06F 1/3209* (2013.01)

(58) Field of Classification Search
CPC ......... H04B 1/036; G06F 1/206; G06F 1/324; G06F 1/329; G06F 1/3203; G06F 1/3296; G06F 9/3885; Y02B 60/50; Y02B 60/144; Y02B 60/1217; Y02B 60/1275; Y02B 60/1285; H04W 24/02; H04W 28/10; H04W 52/36; H04W 52/0251

See application file for complete search history.

(56) References Cited

U.S. PATENT DOCUMENTS

| | | |
|---|---|---|
| 6,428,282 B1 | 8/2002 | Langley |
| 6,995,933 B1 | 2/2006 | Codilian et al. |
| 7,095,577 B1 | 8/2006 | Codilian et al. |
| 7,450,334 B1 | 11/2008 | Wang et al. |
| 7,483,270 B2 | 1/2009 | Blake |
| 7,490,479 B2 | 2/2009 | Byquist et al. |
| 7,701,705 B1 | 4/2010 | Szeremeta |
| 8,064,194 B2 | 11/2011 | Szeremeta |

(Continued)

OTHER PUBLICATIONS

Zachary P. Hills, et al., U.S. Appl. No. 13/957,814, filed Aug. 2, 2013, 24 pages.

(Continued)

*Primary Examiner* — Marsha D. Banks Harold
*Assistant Examiner* — Dharmesh Patel
(74) *Attorney, Agent, or Firm* — Chang & Hale LLP

(57) ABSTRACT

One aspect of an apparatus for controlling temperature of a communications device includes one or more processors configured to monitor the temperature of the communications device, determine if the monitored temperature exceeds a first threshold, determine if the monitored temperature exceeds a second threshold when it is determined that the monitored temperature does not exceed the first threshold, and adjust a rate of data transfer of the communications device when it is determined that the monitored temperature exceeds the second threshold.

24 Claims, 3 Drawing Sheets

(56) References Cited

U.S. PATENT DOCUMENTS

| | | | |
|---|---|---|---|
| 8,090,902 B1 | 1/2012 | Bennett et al. | |
| 8,113,873 B1 | 2/2012 | Sarraf | |
| 8,133,426 B1 | 3/2012 | Yurchenco et al. | |
| 8,244,296 B2 | 8/2012 | Dorsey et al. | |
| 8,295,991 B2 | 10/2012 | Chang et al. | |
| 8,358,395 B1 | 1/2013 | Szeremeta | |
| 8,368,329 B1 | 2/2013 | Depew et al. | |
| 8,386,205 B2 | 2/2013 | Lin | |
| 8,387,890 B2 | 3/2013 | Crocker et al. | |
| 8,417,979 B2 | 4/2013 | Maroney | |
| 8,462,460 B1 | 6/2013 | Szeremeta et al. | |
| 8,498,088 B1 | 7/2013 | Klein | |
| 8,542,537 B2 | 9/2013 | Parker | |
| 8,547,658 B1 | 10/2013 | Szeremeta | |
| 2004/0174833 A1* | 9/2004 | Raith | H04B 1/036 370/311 |
| 2006/0116844 A1* | 6/2006 | Gaur | G01K 7/42 702/130 |
| 2006/0161375 A1* | 7/2006 | Duberstein | G06F 1/206 702/132 |
| 2007/0027580 A1 | 2/2007 | Ligtenberg et al. | |
| 2007/0113109 A1* | 5/2007 | Kim | G06F 1/206 713/300 |
| 2007/0288770 A1* | 12/2007 | Schutte | G06F 1/206 713/300 |
| 2008/0007192 A1 | 1/2008 | Williams et al. | |
| 2008/0168287 A1* | 7/2008 | Berry | G06F 1/266 713/323 |
| 2009/0295590 A1 | 12/2009 | Black et al. | |
| 2010/0328081 A1 | 12/2010 | Hu et al. | |
| 2012/0075992 A1* | 3/2012 | Shahidi | H04B 1/036 370/235 |
| 2012/0078420 A1 | 3/2012 | Jensen et al. | |
| 2012/0329410 A1 | 12/2012 | Balakrishnan et al. | |
| 2013/0100588 A1 | 4/2013 | Chang | |
| 2014/0136827 A1 | 5/2014 | Cho et al. | |
| 2015/0048877 A1* | 2/2015 | Shen | H02M 5/04 327/513 |

OTHER PUBLICATIONS

Guirong Liang, et al., U.S. Appl. No. 14/482,852, filed Sep. 10, 2014, 32 pages.

International Search Report and Written Opinion dated Dec. 28, 2015 from related PCT Serial No. PCT/US2015/046205, 10 pages.

* cited by examiner

METHOD OF OPTIMIZING DEVICE PERFORMANCE BY MAINTAINING DEVICE WITHIN TEMPERATURE LIMITS

CROSS-REFERENCE TO RELATED APPLICATION

This application claims priority to provisional U.S. Patent Application Ser. No. 62/042,727, filed on Aug. 27, 2014, which is hereby incorporated by reference in its entirety.

BACKGROUND

In wireless communication devices, if the device is allowed to transfer data at the maximum rate and the ambient temperature of the device is elevated, the device may exceed the allowable thermal limits. If the internal temperature is not controlled the device may only be able to operate until the maximum operating temperature is achieved at which point the communications device may be forced to shut down. The user may then have to allow the communications device to cool considerably before operation could resume, which can lead to a poor user experience.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

The word "exemplary" is used herein to mean serving as an example, instance, or illustration. Any embodiment described herein as "exemplary" is not necessarily to be construed as preferred or advantageous over other embodiments. Likewise, the term "embodiment" of a device or method does not require that all embodiments of the invention include the described components, structure, features, functionality, processes, advantages, benefits, or modes of operation In the following detailed description, various aspects of a communications device will be presented. These aspects of a communication device are well suited for controlling a temperature thereof. Those skilled in the art will realize that these aspects may be extended to all types of communications devices such as wireless external hard drives, smart phones, cellular phones, laptop computers, tablet devices, global positioning system (GPS) devices, personal digital assistants (PDAs), and two-way radios, just to name a few. Accordingly, any reference to a specific apparatus or method is intended only to illustrate the various aspects of the present invention, with the understanding that such aspects may have a wide range of applications.

One aspect of an apparatus for controlling temperature of a communications device includes one or more processors configured to monitor the temperature of the communications device, determine if the monitored temperature exceeds a first threshold, determine if the monitored temperature exceeds a second threshold when it is determined that the monitored temperature does not exceed the first threshold, and adjust a rate of data transfer of the communications device when it is determined that the monitored temperature exceeds the second threshold.

One aspect of a method of controlling temperature of a communications device includes monitoring the temperature of the communications device, determining if the monitored temperature exceeds a first threshold, determining if the monitored temperature exceeds a second threshold when it is determined that the monitored temperature does not exceed the first threshold, and adjusting a rate of data transfer of the communications device when it is determined that the monitored temperature exceeds the second threshold.

Figure 1:
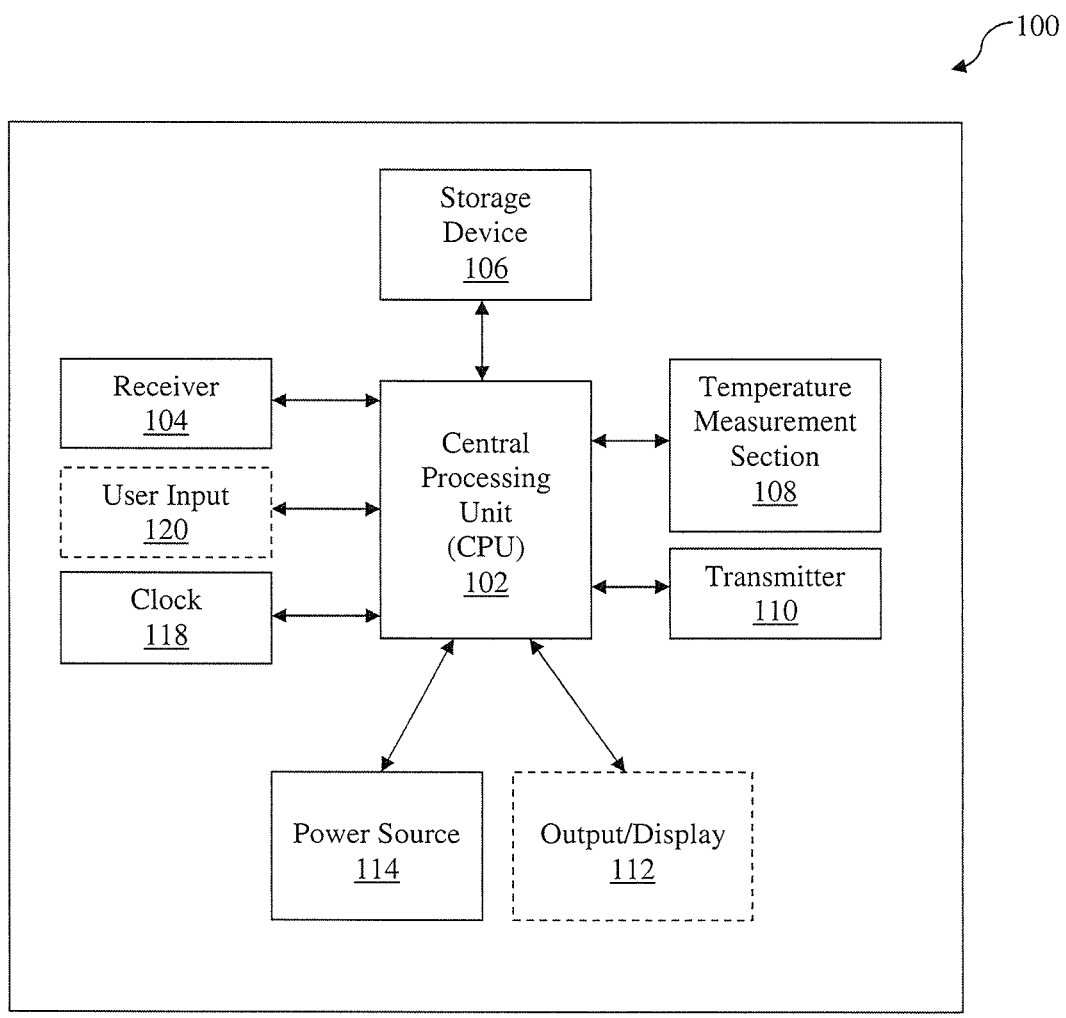
FIG. 1 is a diagram illustrating an exemplary embodiment of a communications device.

FIG. 1 is a block diagram illustrating an exemplary embodiment of a communications device 100. For example, the communications device 100 can include a wireless communications device. Referring to FIG. 1, the communications device 100 can include a receiver 104, a storage device 106, a temperature measurement section 108, a transmitter 110, an optional output/display 112, a power source 114, a clock 118, and an optional user input 120, each of which is operatively coupled to a central processing unit (CPU) 102.

In an exemplary embodiment, the receiver 104 can be configured to communicate, via a communication link (not shown) with a transmitter of an external device (not shown), to receive encoded data signals from the transmitter of the external device for, among others, signal mixing, demodulation, and other data processing. The optional user input 120 of the communications device 100 can be configured to allow a user to enter information into the communications device 100 as needed. For example, the user input 120 may include one or more keys of a keypad, a touch-sensitive screen, or a voice-activated input command unit. The temperature measurement section 108 can be configured to provide temperature information of the communications device 100 to the CPU 102, while the clock 118 provides, among others, real time information to the CPU 102 (e.g., temperature measurements). For example, the temperature measurement section 108 can include a thermistor, a thermocouple, a resistive temperature sensor, a voltage output temperature sensor, and/or a silicon temperature sensor that is used to measure the internal temperature of the communications device 100. In an exemplary embodiment, the temperature measurement section 108 can provide the CPU 102 with temperature data associated with each of the various components of the communications device 100.

Each of the various components of the communications device 100 shown in FIG. 1 can be powered by the power source 114 which, in an exemplary embodiment, includes a battery. The transmitter 110 in the communications device 100 can be configured to provide a communication link and transmit data to an external device (not shown). The communication link with the external device (not shown) can be made, for example, a wireless communications link. The optional output/display 112 of the communications device 100 can be configured to provide, among others, a graphical user interface (GUI) such as a liquid crystal display (LCD) for displaying information to a user. Additionally, the output/display 112 may also include an integrated speaker for outputting audible signals as well as to provide vibration output as commonly found in handheld electronic devices, such as mobile telephones presently available. In an exemplary embodiment, the communications device 100 can also include an electro-luminescent lamp (not shown) configured to provide backlighting to the output/display 112 for output visual display in dark ambient surroundings. Still referring to FIG. 1, the communications device 100 in an exemplary embodiment may also include a storage device 106 such as a programmable, non-volatile memory device operatively coupled to the CPU 102. The CPU 102 can further configured to perform Manchester decoding as well as error detection and correction upon the encoded data signals received at the receiver 104 from an external device (not shown).

Figure 2:
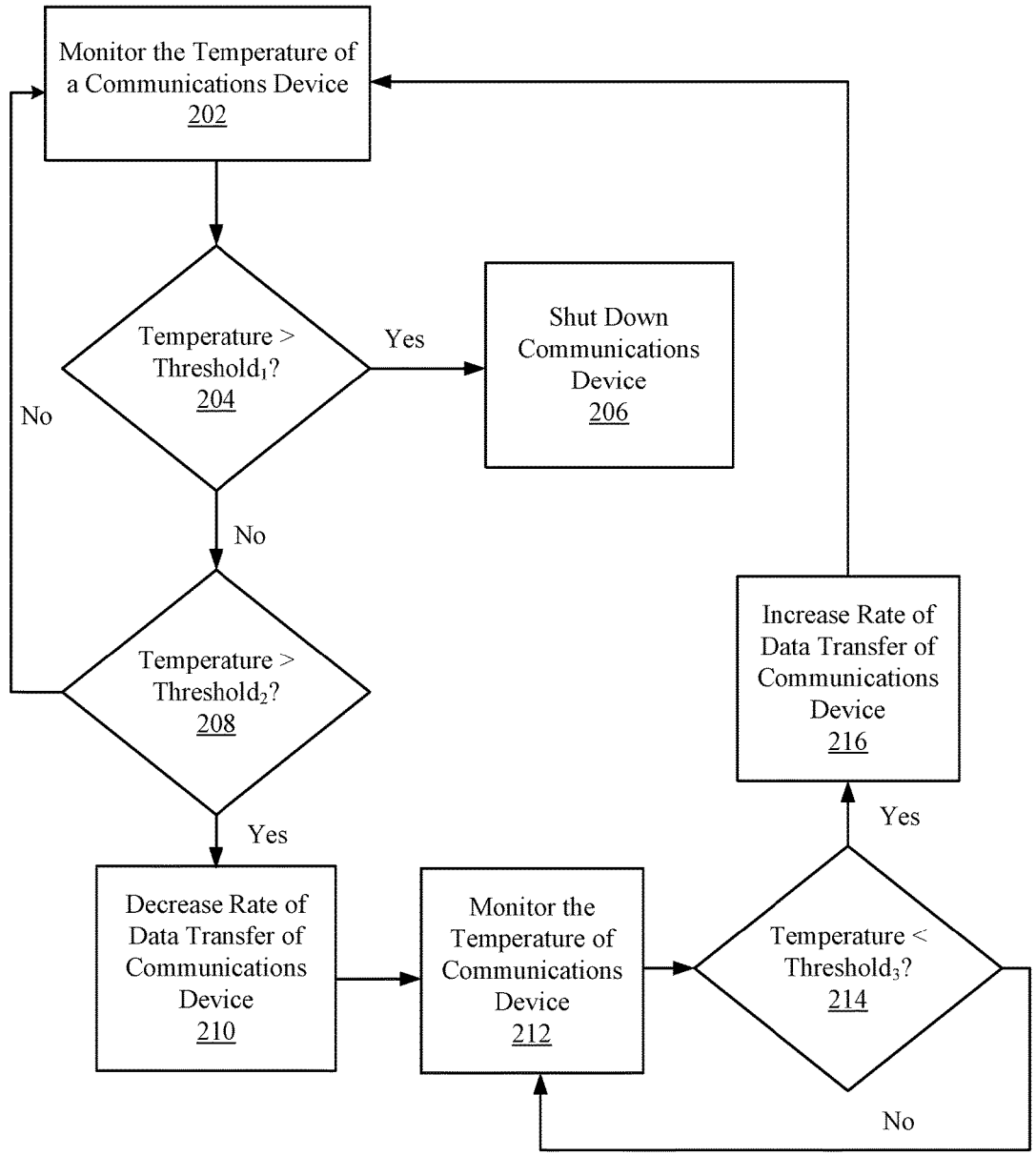
FIG. 2 is a flowchart illustrating an exemplary embodiment for controlling temperature of a communications device.

FIG. 2 is a flowchart illustrating an exemplary embodiment for controlling temperature of a communications device, as represented by block 200. Each of the steps in the flow chart can be controlled using one or more processors of a wireless communications device or by some other suitable means. As represented by block 202, the temperature of the communications device can be monitored. For example, with reference to FIG. 1, the temperature of the communications device 100 can be monitored using temperature measurement section 108. In an exemplary embodiment, the temperature measurement section 108 can be used to monitor an internal temperature within a housing of the communications device 100. For example, the temperature measurement section 108 can include a thermistor, a thermocouple, a resistive temperature sensor, a voltage output temperature sensor, and/or a silicon temperature sensor that is used to measure the internal temperature of the communications device 100. In an exemplary embodiment, the temperature of each of a plurality of internal components of the communications device 100 can be monitored using the temperature measurement section 108, which can include a plurality of temperature sensors each configured to measure the temperature of a particular component of the communications device 100. As represented by block 204, the communications device can determine if the temperature exceeds a first threshold $T_1$. For example, the central processing unit (CPU) 102, illustrated in FIG. 1, can be used to determine if the temperature monitored by the temperature measurement section 108 exceeds $T_1$. In an exemplary embodiment, $T_1$ can be an over-temperature shutdown threshold. That is, if it is determined that the temperature of the communications device 100 exceeds $T_1$, then as represented by block 206, the communications device 100 can be shut down. For example, with reference to FIG. 1, when the CPU 102 determines that the temperature of the communications device 100 exceeds the over-temperature shutdown threshold $T_1$, the CPU 102 can power off, thereby shutting down the communications device 100. Shutting down the communications device 100 when the temperature exceeds the over-temperature shutdown limit $T_1$ may prevent the internal components and/or circuitry of the communications device 100 from being damaged due to prolonged exposure to heat.

However, if the CPU 102 determines that the temperature of the communications device does not exceed $T_1$, then the CPU 102 will not power off, and the CPU 102 can then determine if the monitored temperature exceeds a second threshold $T_2$, as represented by block 208. In an exemplary embodiment, the second threshold $T_2$ is a throttle threshold. That is, if the CPU 102 determines that the monitored temperature of the communications device 100 exceeds the throttle threshold $T_2$, then as represented by block 210, a rate of data transfer of the communications device can be decreased to effectively lower the temperature of the communications device 100. In an exemplary embodiment, referring again to FIG. 1, the rate of data transfer can be decreased by throttling the power the CPU 102 receives from power source 114 and/or by modulating a clocking of the CPU 102 such that the circuitry of the CPU 102 is run at a slower rate. Still referring to FIG. 1, the rate of data transfer of the communications device 100 can also be decreased by adjusting a voltage of an output stage of the transmitter 110. In an exemplary embodiment, the CPU 102 can decrease the rate of data transfer by a predetermined amount each time the monitored temperature exceeds the throttle threshold $T_2$, regardless of the amount by which the monitored temperature exceeds $T_2$. Alternately, the CPU 102 can decrease the rate of data transfer to a rate that is associated with the monitored temperature of the communications device 100. For example, the CPU 102 can compare the monitored temperature to a list of correlated temperatures and power levels, and/or by implementing at least one of a proportional-integral-derivative controller or a proportional controller with hysteresis. By decreasing the rate of data transfer, the temperature of the communications device 100 can be lowered before it reaches the over-temperature shutdown threshold $T_1$. However, if at block 208 it is determined that the monitored temperature of the communications device 100 does not exceed the throttle threshold $T_2$, then the communications device does not throttle the rate of data transfer, and the process starts back at block 202.

As represented by block 212, the temperature of the communications device 100 can be monitored again after the rate of data transfer is decreased. For example, with reference to FIG. 1, the temperature of the communications device 100 can again be monitored using the temperature measurement section 108. In an exemplary embodiment, the temperature of the communications device 100 being monitored can be a temperature within a housing of the communications device 100. As represented by block 214, the communications device 100 can determine if the temperature is less than a third threshold $T_3$. In an exemplary embodiment, $T_3$ can be a safety threshold. That is, if at block 214 it is determined that the temperature of the communications device 100 is less than safety threshold $T_3$, then this can be an indication that the temperature of the communications device 100 has decreased to a safe level (e.g., due to throttling the rate of data transfer), and the rate of data transfer can be increased without risking damage to the internal circuitry of the communications device 100, as represented by block 216. In an exemplary embodiment, the rate of data transfer can be increased to a maximum rate for the communications device 100. Once the data transfer rate of the communications device has been increased, then the process can start back at block 202. However, if a block 214 it is determined that the temperature of the communications device 100 is not less than the safety threshold $T_3$, then the temperature monitor section 108 can continue to monitor the temperature of the communications device until the temperature is lower than the safety threshold $T_3$, as represented by block 212. In this manner, a temperature of the communications device 100 can be controlled to avoid damage to the internal components and/or circuitry. In addition, by monitoring temperature and throttling the rate of data transfer, the communications device 100 may be able to avoid a shutdown procedure due to an excessive temperature, which may provide a better user experience.

Figure 3:
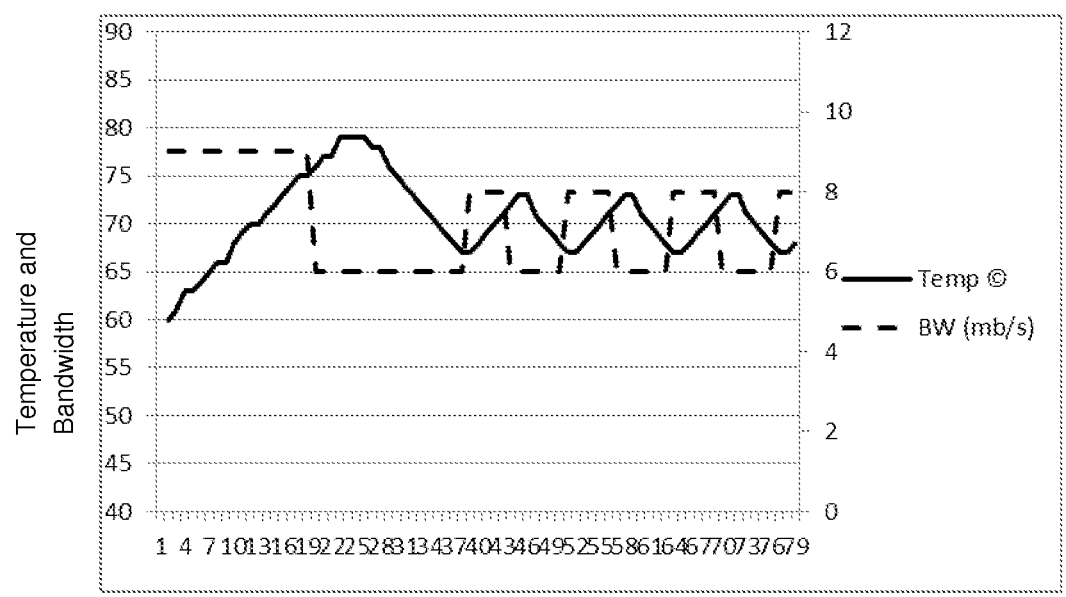
FIG. 3 is a graphical illustration of an exemplary embodiment for throttling bandwidth to control temperature.

FIG. 3 is a graphical illustration representing the correlation between throttling the bandwidth and a decrease in the temperature of the communications device 100. Referring to FIG. 3, if the throttle threshold (e.g., $T_2$ with reference to FIG. 2) is 74° C., then each time the monitored temperature of the communications device 100 reaches 74° C., the CPU 102 can be configured to throttle the bandwidth to 65 mb/s. Then when the monitored temperature of the communications device 100 is determined to reach or be lower than the safety threshold (e.g., $T_3$ with reference to FIG. 2), then the bandwidth can be increased to 80 mb/s. In this manner, a temperature of the communications device 100 can be controlled to avoid damage to the internal components and/or circuitry. In addition, by monitoring temperature and throttling the rate of data transfer, the communications device 100 may be able to avoid a shutdown procedure due to an excessive temperature, which may provide a better user experience.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus for controlling temperature of a communications device, the apparatus comprising:
   one or more processors configured to:
      monitor the temperature of the communications device relative to a shutdown threshold, a throttle threshold, and a safety threshold;
      determine if the monitored temperature exceeds the first shutdown threshold;
      in response to determining that the monitored temperature does not exceed the shutdown threshold, determine if the monitored temperature exceeds the throttle threshold;
      in response to determining that the monitored temperature exceeds the throttle threshold and does not exceed the shutdown threshold, decrease a rate of data transfer of the communications device, wherein the rate of data transfer is decreased by an amount that is proportionally related to the monitored temperature;
      after the rate of data transfer has been decreased, monitor the temperature of the communications device;
      in response to determining that the monitored temperature exceeds the throttle threshold, determine if the monitored temperature is below the safety threshold; and
      in response to determining that the monitored temperature is below the safety threshold, increase the rate of data transfer of the communications device.

2. The apparatus of claim 1, wherein the one or more processors are further configured to adjust the rate of data transfer of the communications device by adjusting a bandwidth of the communications device.

3. The apparatus of claim 1, wherein:
   the communications device comprises a central processing unit (CPU) including circuitry; and
   the one or more processors are further configured to adjust the rate of data transfer of the communications device by at least one of throttling a power of the CPU or modulating a clocking of the CPU such that the circuitry is run at a slower rate.

4. The apparatus of claim 1, wherein:
   the communications device comprises a transmitter including an output stage; and
   the one or more processors are further configured to adjust the rate of data transfer of the communications device by adjusting a voltage of the output stage.

5. The apparatus of claim 1, wherein the one or more processors are further configured to:
   in response to determining that the monitored temperature is below the safety threshold, adjust the rate of data transfer of the communications device to a maximum rate by adjusting a power of the communications device to a maximum power.

6. The apparatus of claim 1, wherein the one or more processors are further configured to:
   in response to determining that the monitored temperature exceeds the shutdown threshold, disable the communications device.

7. The apparatus of claim 1, wherein the one or more processors are further configured to:
   in response to determining that the monitored temperature exceeds the throttle threshold, determine a data rate associated with the monitored temperature.

8. The apparatus of claim 7, wherein the one or more processors are configured to determine a data rate associated with the monitored temperature by comparing the monitored temperature to a list of correlated temperatures and power levels, or by implementing at least one of a proportional-integral-derivative controller or a proportional controller.

9. The apparatus of claim 7, wherein the one or more processors are configured to adjust the rate of data transfer of the communications device by adjusting the rate of data transfer to the determined data rate.

10. The apparatus of claim 1, wherein the monitored temperature associated with the communications device comprises an internal temperature of the communications device.

11. The apparatus of claim 1, wherein the one or more processors are configured to monitor the temperature of the communications device by monitoring a temperature of each of a plurality of components of the communications device.

12. The apparatus of claim 11, wherein the one or more processors are configured to:
   determine if the monitored temperature exceeds the shutdown threshold by determining if the monitored temperature of any of the plurality of components exceeds the shutdown threshold;

determine if the monitored temperature exceeds the throttle threshold by, in response to determining that the temperature of each of the plurality of components does not exceed the shutdown threshold, determining if the monitored temperature of any of the plurality of components exceeds the throttle threshold; and decrease the rate of data transfer of the communications device by, in response to determining that the monitored temperature of any of the plurality of components exceeds the throttle threshold, adjusting the rate of data transfer of the communications device.

13. A method of controlling temperature of a communications device, the method comprising:

in at least one or more processors:

monitoring the temperature of the communications device relative to a shutdown threshold, a throttle threshold, and a safety threshold;

determining if the monitored temperature exceeds the shutdown threshold;

in response to determining that the monitored temperature does not exceed the shutdown threshold, determining if the monitored temperature exceeds the throttle threshold;

in response to determining that the monitored temperature exceeds the throttle threshold and does not exceed the shutdown threshold, decreasing a rate of data transfer of the communications device, wherein the rate of data transfer is decreased by an amount that is proportionally related to the monitored temperature;

after the rate of data transfer has been decreased, monitoring the temperature of the communications device;

in response to determining that the monitored temperature exceeds the throttle threshold, determining if the monitored temperature is below the safety threshold; and in response to determining that the monitored temperature is below the safety threshold, increasing the rate of data transfer of the communications device.

14. The method of claim 13, wherein adjusting the rate of data transfer of the communications device comprises adjusting a bandwidth of the communications device.

15. The method of claim 13, wherein adjusting the rate of data transfer of the communications device comprises at least one of throttling a power of a central processing unit (CPU) of the communications device or modulating a clocking of the CPU such that a circuitry of the CPU is run at a slower rate.

16. The method of claim 13, wherein adjusting the rate of data transfer of the communications device comprises adjusting a voltage of an output stage of a transmitter of the communications device.

17. The method of claim 13, further comprising:

in response to determining that the monitored temperature is below the safety threshold, adjusting the rate of data transfer of the communications device to a maximum rate by adjusting a power of the communications device to a maximum power.

18. The method of claim 13, further comprising:

in response to determining that the monitored temperature exceeds the shutdown threshold, disabling the communications device.

19. The method of claim 13, further comprising:

in response to determining that the monitored temperature exceeds the throttle threshold, determining a data rate associated with the monitored temperature.

20. The method of claim 19, wherein determining the data rate associated with the monitored temperature comprises at least one of comparing the monitored temperature to a list of correlated temperatures and data rates, or implementing at least one of a proportional-integral-derivative controller or a proportional controller.

21. The method of claim 19, wherein adjusting the rate of data transfer of the communications device comprises adjusting the rate of data transfer to the determined data rate.

22. The method of claim 13, wherein the monitored temperature of the communications device comprises an internal temperature of the communications device.

23. The method of claim 13, wherein monitoring the temperature of the communications device comprises monitoring a temperature of each of a plurality of components of the communications device.

24. The method of claim 23, wherein:

determining if the monitored temperature exceeds the shutdown threshold comprises determining if the monitored temperature of any of the plurality of components exceeds the shutdown threshold;

determining if the monitored temperature exceeds the throttle threshold comprises, in response to determining that the temperature of each of the plurality of components does not exceed the shutdown threshold, determining if the monitored temperature of any of the plurality of components exceeds the throttle threshold; and decreasing the rate of data transfer of the communications device comprises, in response to determining that the monitored temperature of any of the plurality of components exceeds the throttle threshold, adjusting the rate of data transfer of the communications device.

* * * * *